W. S. KAIL.
MOLD.
APPLICATION FILED NOV. 25, 1911.

1,112,804.

Patented Oct. 6, 1914.
2 SHEETS—SHEET 1.

Witnesses
Edward P. Rea.
Juana M. Fallin

Inventor
W. S. Kail
By A. W. Lacy, Attorney.

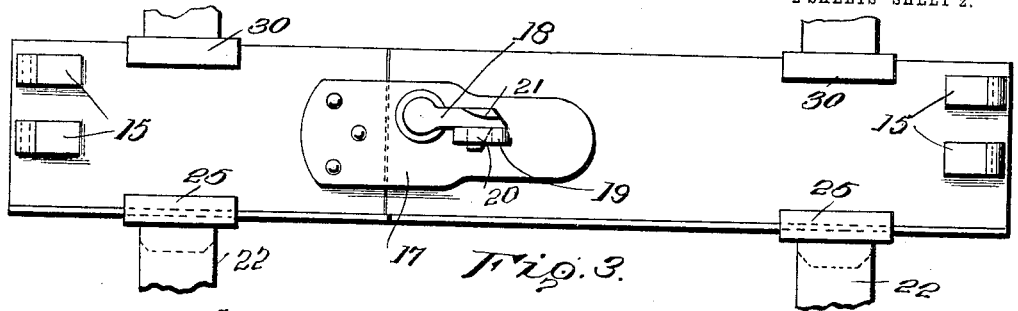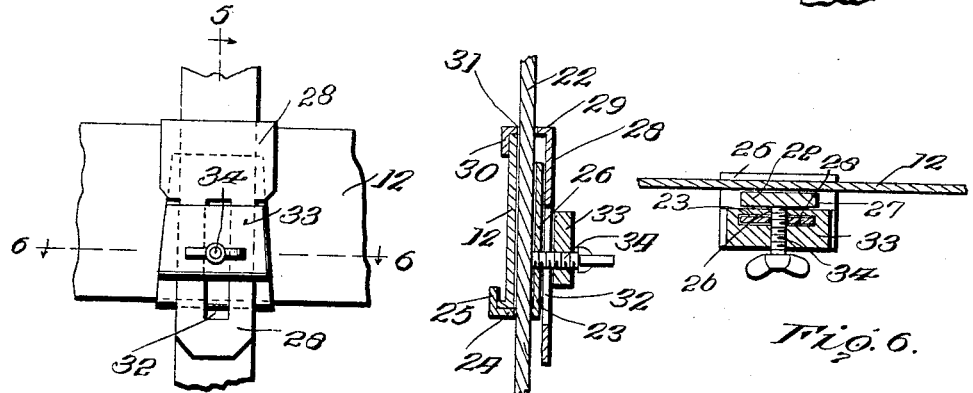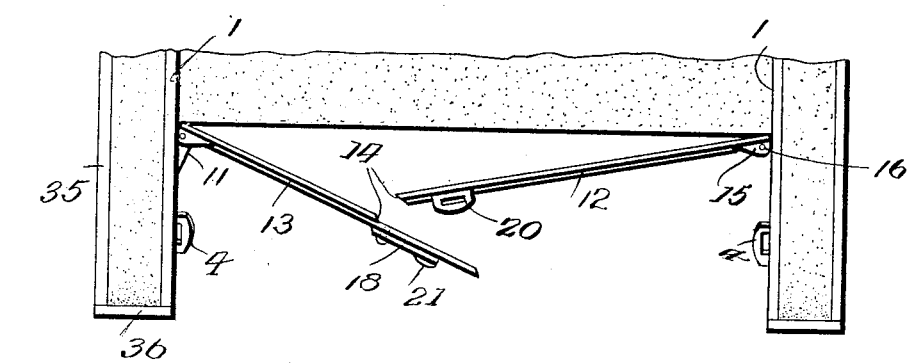

UNITED STATES PATENT OFFICE.

WILBERT S. KAIL, OF SCIO, OHIO, ASSIGNOR OF ONE-HALF TO GEORGE LOVE, OF SCIO, OHIO.

MOLD.

1,112,804. Specification of Letters Patent. Patented Oct. 6, 1914.

Application filed November 25, 1911. Serial No. 662,515.

*To all whom it may concern:*

Be it known that I, WILBERT S. KAIL, citizen of the United States, residing at Scio, in the county of Harrison and State of Ohio, have invented certain new and useful Improvements in Molds, of which the following is a specification.

This invention relates to molds for molding concrete steps *in situ*. Heretofore, it has been customary to build up such a mold from boards, suitably assembled and nailed together, the plastic material to form the steps being poured into the form thus constructed. After setting of the material it was necessary to knock down the form and in doing this the boards were so mutilated as to be rendered unfit for further use.

The present invention therefore contemplates the provision of a mold which may be repeatedly used and which will accurately form or mold the steps and which may be removed from the molded structure without in any way disturbing the same.

The invention aims further to provide a mold for the purpose stated which may be readily adjusted so as to mold steps of different widths.

A still further object of the invention is to so construct the mold that by detaching its sections, any number of steps may be molded in succession.

For a full understanding of the invention reference is to be had to the following description and accompanying drawing, in which:—

Figure 1:
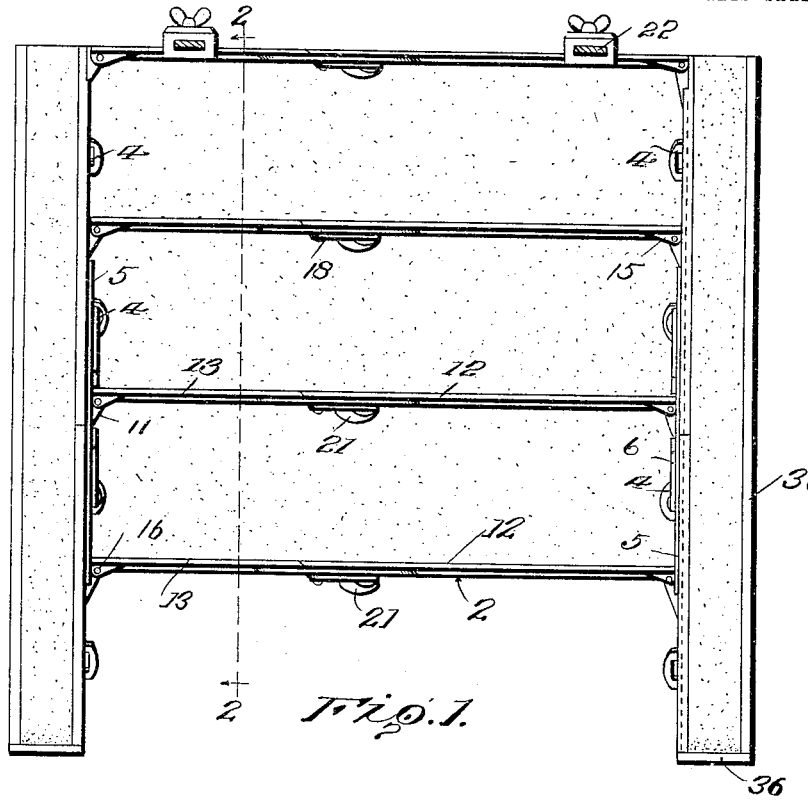
Figure 2:
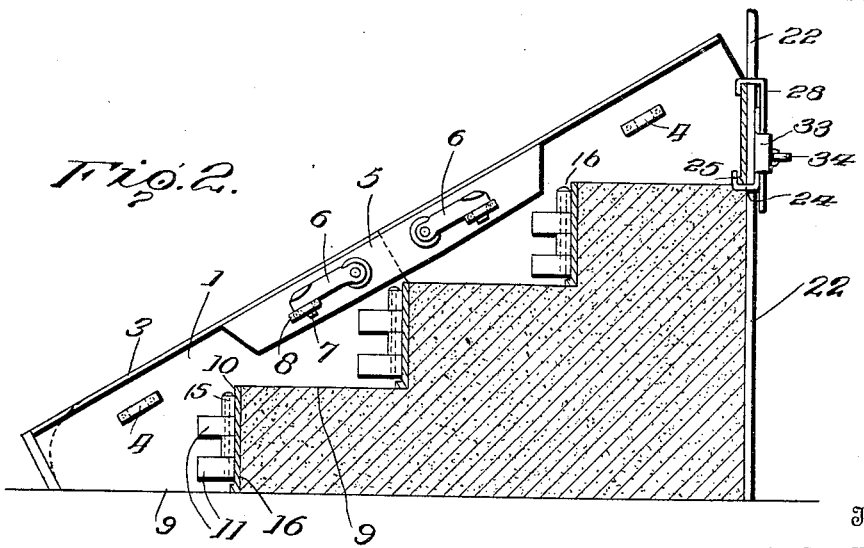

Figure 1 is a top plan view of a mold constructed in accordance with the present invention. Fig. 2 is a vertical sectional view therethrough taken in a plane from front to rear, on the line 2—2 of Fig. 1. Fig. 3 is a detail view in front elevation of one of the form-plates of the mold. Fig. 4 is a rear elevation of one of the supporting devices for the mold. Fig. 5 is a vertical section on the line 5—5 of Fig. 4. Fig. 6 is a horizontal section on the line 6—6 of Fig. 4. Fig. 7 is a fragmentary view similar to Fig. 1 showing one of the form plates in top plan and showing the sections thereof swung open.

Corresponding and like parts are referred to in the following description and indicated in all the views of the accompanying drawing by the same reference characters.

In the drawings the mold is illustrated as embodying sections which are designed to be detachably connected so that a number of steps may be successively molded or formed, and each of these sections includes side-plates 1 and form-plates which are indicated in general by the numeral 2 and extend between the said side-plates. The upper edge of each side-plate 1 is of right-line extent as clearly shown in the drawings and is formed with a relatively narrow inwardly projecting flange 3 extending throughout the entire length thereof. Each side-plate 1 is formed on its inner face at points equidistant from its ends with keepers 4 and for the purpose of connecting the side-plates of the adjacent sections, there are provided connecting plates 5 upon each of which there is pivoted a pair of latches 6 having hooked ends 7 designed to engage with the keepers 4, the plates being formed with slots 8 through which these keepers project when the plates are disposed against the sides of the plates 1 in the manner shown in Fig. 2 of the drawing. The molded sections are in this manner firmly connected and are held against relative displacement not only by the latches 6 but also by the engagement of the upper edges beneath the inwardly projected flanges 3 of the side-plates 1 of the sections. At this point it will be understood that the plates 5 are disposed against adjacent or meeting ends of the side-plates of the connected sections of the mold and that the lower section may have its upper end disconnected from the lower end of the section next above and then have its lower end connected with the upper end of the last mentioned section. In this manner, the sections may be successively interchanged to successively mold the steps until the desired number have been formed, it being understood that each end edge of each side-plate 1 extends at right-angles to the upper edge thereof and that the said end-edges of the assembled side-plates are designed to mesh.

The under edge of each side-plate 1 is stepped so as to form downwardly presented edge portions 9 and rearwardly presented vertical edge portions 10 and upon the inner face of each side-plate at each edge portion 10 thereof there is formed a pair of pintle lugs 11. As before stated, the side-plates of each mold section are connected by form-plates 2 and each of these form-plates comprises a section 12 and a section 13, the section 12 being of greater length than the section 13 and the said sections having beveled meeting edges 14. Each section is formed, at its outer end, with a pair of pintle lugs 15, and these pintle lugs are assembled with the lugs 11 upon the side-plates in the manner shown in Fig. 2 of the drawing and hinged pins 16 are removably fitted through the interfitting lugs. In this manner the sections of the form plates are hingedly and detachably connected with the side-plates of the mold and may be swung to assume the position shown in Fig. 1 of the drawings, in which position the said sections lie in a common vertical plane, or may be swung forwardly as shown in Fig. 7 of the drawings. In order to hold the sections in the position shown in Fig. 1, each section 13 is provided with a fixed latch-plate 17 which projects beyond its free end and carries a pivoted hook latch 18. Each of the latch-plates 17 is formed with a slot 19 and each section 12 is provided upon its forward face with a keeper 20 designed to project through the slot in the latch-plate of the related section 13, when the sections are in the position shown in Fig. 1 and the latch 18 is then engaged at its hooked end with the keeper. Each latch 18 is provided with a finger-piece 21 by means of which it may be readily swung up out of engagement with its related keeper when it is desired to swing the sections of the form-plate forwardly, as shown in Fig. 7.

In using the mold, it is preferable to first employ the sections arranged as shown in Fig. 2 and after the first three steps have been molded to disconnect the lower section from the upper section and then connect the lower end of the lower section to the upper end of the upper section.

The means for supporting the sections during the molding operation will now be described.

The supporting means mentioned above includes standards which are preferably two in number and are indicated in the drawing by the numeral 22. Each of these standards is preferably in the form of a suitable length of stout bar-metal. Each standard supports adjustably a device for gripping the uppermost form-plate of the mold section to be supported and each of these gripping devices comprises a clip-member in the nature of a plate 23 having its lower-end portion bent forwardly at right angles as at 24 and thence upwardly at right-angles to its portion 24, as at 25. The plate or body of this member is formed with an opening 26 and the portion 24 of the member is formed with a slot 27 slidably receiving the respective standard 22. The other clip-member comprises a plate 28 having its upper end-portion bent forwardly as at 29 and extends downwardly at right-angles as at 30, its portion 29 being formed with a slot 31 in vertical alinement with the slot 27 and slidably receiving the said standard 22. The body of the member 28 is formed with a vertically extending slot 32. The body of the member 23 is also formed with an outstanding yoke 33 which slidably receives the body of the member 28 in the manner illustrated in Figs. 4, 5 and 6 of the drawings, and a set-screw 34 is threaded through the yoke 33 and engages through the slot 32 and through the opening 26 and is designed to bear at its end against the standard 22. One or the other of the sections of the form-plate is illustrated, in Fig. 5 of the drawings, as indicated at its lower upper edges respectively between bent lower and upper ends of the clip-members 23 and 28. It will be understood from the above that by loosening the set-screw the clip device may be adjusted up or down upon their respective standards 22 and engaged in the manner illustrated in Fig. 5 with the form-plates to be gripped, after which the set-screws are to be tightened, whereby to hold the clip-devices at adjustment.

Where the mold is adapted for molding curbing at each side of the flight of steps, a form-plate 35 is positioned beside and in spaced relation to each side-plate of the mold in the manner shown in Figs. 1 and 7 of the drawing, and these form-plates and the respective side-plates are connected at their lower ends by a plate 36. The concrete or the plastic material from which the steps are to be formed is of course poured between the form-plates 35 and the side-plates or mold sections and will unite with the mass forming the steps.

Having thus described the invention what is claimed as new is:—

1. A stair mold including spaced side plates, spaced form plates each including sections hingedly connected at their remote ends to the side plates, said sections being reduced in thickness at their adjacent ends to overlap each other and present smooth uninterrupted surfaces, and means for detachably securing said adjacent ends in overlapping position, said means including a keeper carried by one of the ends and extensible through a slot in the overlapping end, and a pivot latch carried by the slotted end and adapted for engagement with the keeper.

2. A stair mold including spaced side plates having their upper edges of right-line extent and their lower edges stepped to provide outwardly presented horizontal edge portions and rearwardly presented vertical edge portions, and form plates hingedly connected to the side plates adjacent the rearwardly presented vertical edge portions thereof.

In testimony whereof I affix my signature in presence of two witnesses.

WILBERT S. KAIL. [L. S.]

Witnesses:
J. E. MANGHIMAN,
J. W. BURRIER.

Copies of this patent may be obtained for five cents each, by addressing the "Commissioner of Patents, Washington, D. C."